Figure 1:
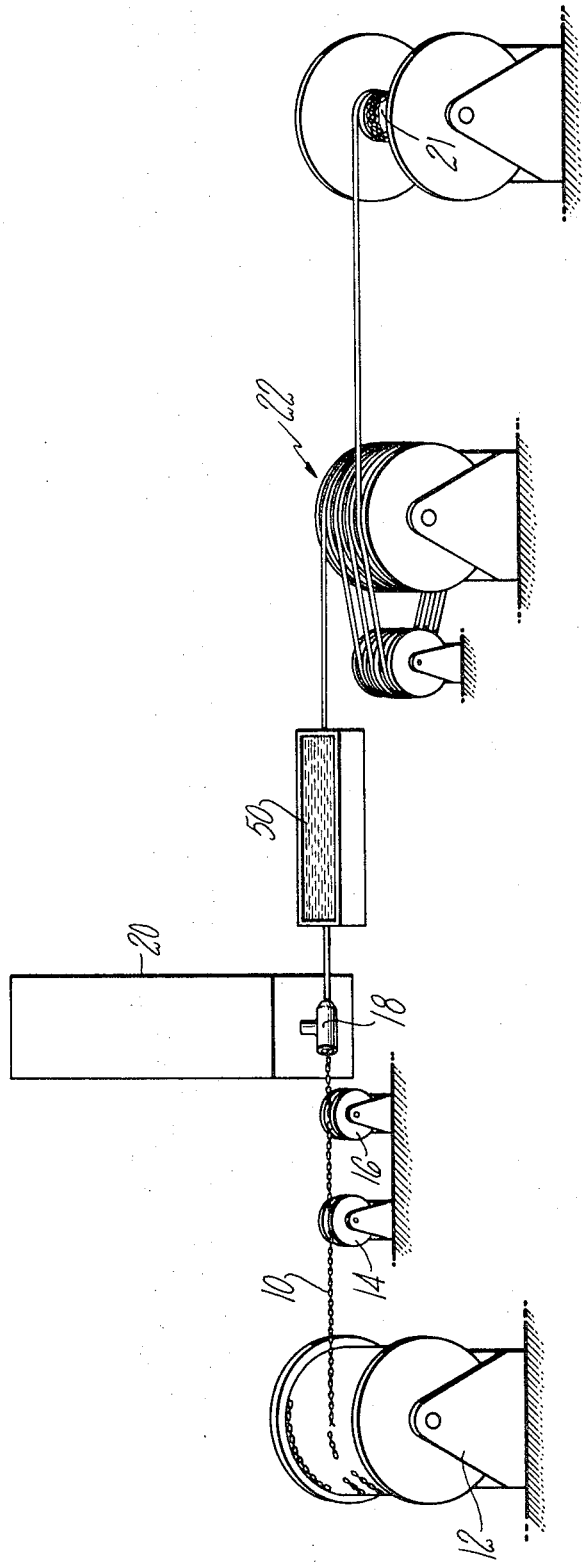

United States Patent

[11] 3,574,996

[72] Inventor August W. Loos
Rte. 169, Pomfret, Conn. 06258
[21] Appl. No. 791,926
[22] Filed Jan. 17, 1969
[45] Patented Apr. 13, 1971

[54] TUBULAR SHEATHED CHAIN
2 Claims, 2 Drawing Figs.
[52] U.S. Cl............................................. 59/78,
264/90
[51] Int. Cl............................................. B21l 11/00
[50] Field of Search................................. 59/78, 80,
82, 35; 264/90; 18/13 (H), (Vac. Digest)

[56] References Cited
UNITED STATES PATENTS
1,105,925 8/1914 Reynolds.................... 59/78

| 2,020,943 | 11/1935 | Hallquist...................... | 59/78 |
| 2,110,226 | 3/1938 | Hill.............................. | 59/78 |
| 2,708,771 | 5/1955 | Stoneback.................... | 18/13 |
| 2,956,305 | 10/1960 | Raydt........................... | 264/90 |
| 2,956,311 | 10/1960 | Raydt........................... | 264/90 |

Primary Examiner—Charles W. Lanham
Assistant Examiner—Gene P. Crosby
Attorney—Prutzman, Hayes, Kalb & Chilton ABSTRACT: A tubular sheathed chain having an undulate sheath conforming to links of the chain and continuously urging it toward a fully extended condition, while maintaining its flexibility which if formed by extruding a tubular plastic sheath about a link chain being fed along a path and continuously collapsing the sheath at a predetermined point in the path downstream of a sheath forming station such that the sheath is collapsed into contact about the chain while in a relaxed plastic condition.

INVENTOR.
AUGUST W. LOOS

BY Prutzman, Hayes, Kalb and Chilton

ATTORNEYS

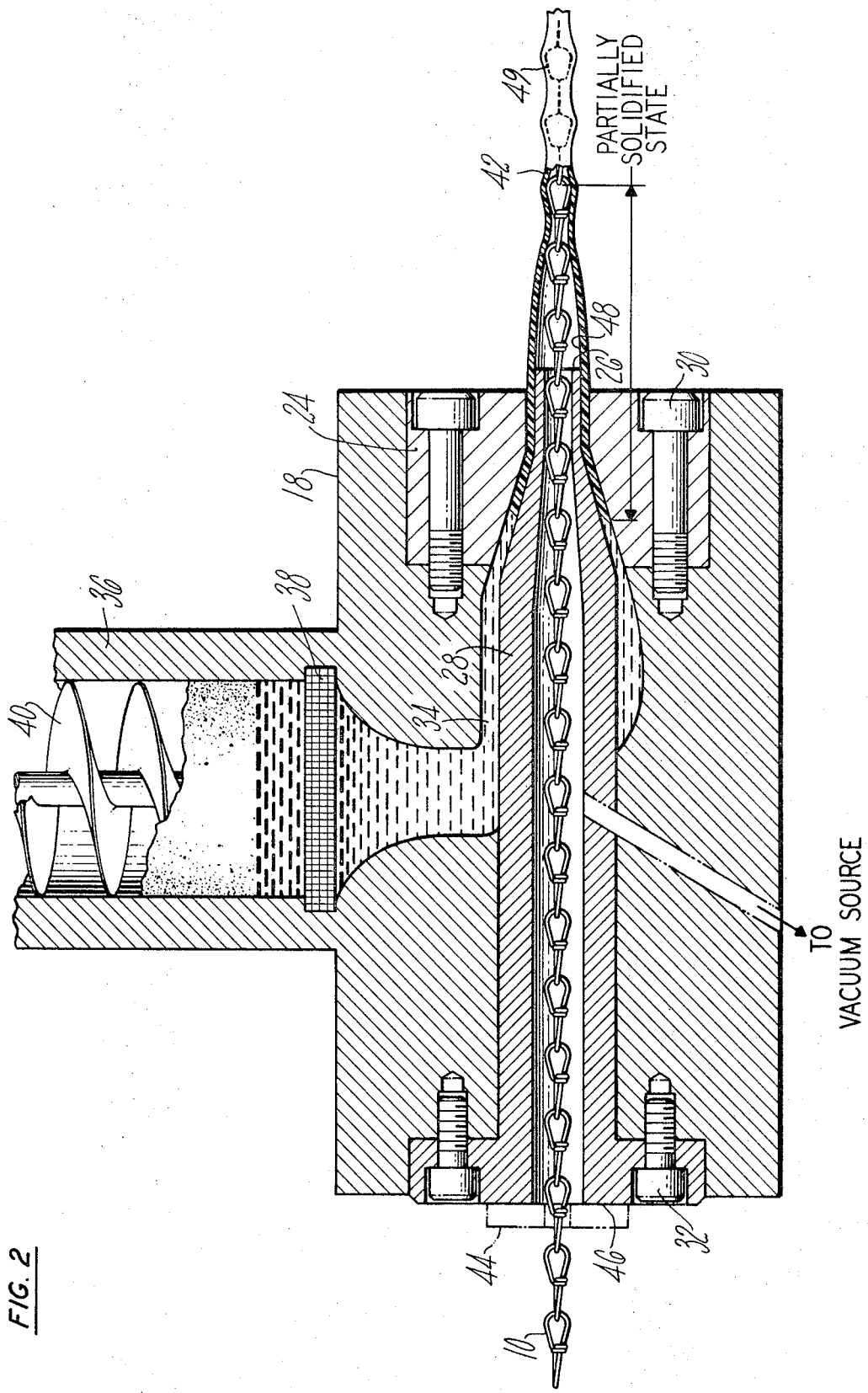

TUBULAR SHEATHED CHAIN

This invention concerns the application of a tubular plastic sheath to link chain to provide a significantly improved sheathed chain for diverse industrial and commercial use.

A primary object of this invention is to provide an improved method of forming a chain having a generally tubular outer plastic sheath virtually impossible to displace relative to the chain.

Another object of this invention is to provide such a method featuring improved manufacturing techniques in a significantly simplified sequence of steps conducive to low-cost manufacture in a relatively high-speed operation.

A further object of this invention is to provide a method of the type described for manufacturing tubular sheathed chain which readily lends itself to the production of improved sheathed chain for various end product applications.

A further object of this invention is to provide an improved tubular sheathed chain having an exceptionally tenacious sheath of rugged construction capable of providing extended dependable service.

Other objects will be in part obvious and in part pointed out more in detail hereinafter.

A better understanding of the objects, advantages, features, properties and relationships of this invention will be obtained from the following detailed description and the accompanying illustrative drawings.

In the drawings:

FIG. 1 is a diagrammatic view of an apparatus used in the method of this invention; and FIG. 2 is an enlarged view, partly in section and partly broken away, showing a part of the apparatus of FIG. 1.

Referring now to the drawings in detail, an apparatus is shown for applying a sheath to a length of link chain 10 being paid off an unwind stand 12 to pass over a pair of sheaves 14, 16 and through a crosshead 18 of an extruder 20 along a generally horizontal path. One end of the chain 10 will be understood to be initially secured to a tension-takeup reel 21 positioned downstream of a capstan 22 about which the chain 10 is wound before being drawn onto a tension-takeup reel 21. The reel 21 may be provided with suitable tensioning and reel-traversing equipment, not shown, for ensuring that the chain will be smoothly and uniformly wound onto the reel 21 in accordance with well-known techniques.

In the specific illustrated embodiment, the extruder 20 is shown having a tubing die 24 coaxially surrounding a discharge end or nose 26 of a hollow guide die 28 respectively secured to the crosshead 18 of the extruder 20 by machine bolts such as at 30 and 32 with the guide die 28 firmly fixed in position within a streamlined flow channel 34 of controlled dimensions in the crosshead 18.

To ensure an even flow of uniform melt through the flow channel 34, free of small particles of unmelted resin, a suitably heated cylinder 36 is provided with a conventional screen pack 38 at its discharge end whereby a suitable extrudate composition is continuously delivered to the flow channel 34 in a plastic melt under pressure upon operation of a revolving screw 40 mounted within the cylinder 36. As will be apparent to those skilled in the art, heaters, not shown, may also be positioned in the crosshead 18 to maintain the desired uniform extrudate temperature to eliminate any localized hot or cold spots.

To form a tough, tubular, continuous plastic sheath 42 about the chain 10 which is virtually impossible to displace and which continuously urges the chain toward an extended condition while at the same time ensuring the flexibility of the chain in accordance with this invention, the outside dimension of the guide die 28 is substantially greater than the maximum lateral dimension of the chain links and provision is made to effect a predetermined positive pressure differential between the outer and inner walls of the sheath 42 downstream of the nose 26 of the guide die 28 to cause a significant drawdown of the extruded sheath 42. The sheath 42 is thus first formed about the chain 10 emerging from the guide die 28 and is then applied onto the chain 10 into contact with its outer surfaces downstream of the die 28 to adhere and travel with the chain 10.

To prevent any hangup of the extrudate composition as well as to ensure a sheath 42 of predetermined regulated thickness, the chain 10 preferably emerges from the extruder 20 at a speed approximately between 80 and 120 feet per minute, a speed of travel somewhat greater than that of the extrusion rate of the plastic, to somewhat stretch the partially solidified plastic as it leaves the extruder 20.

While various techniques may be employed to effect the described pressure differential, a suction force may be continuously applied, e.g., at an intermediate portion of the guide die 28 as indicated in dotted lines in FIG. 2, and it may be desired to secure a suitable seal 44 to the entrance end 46 of the guide die 28 to ensure that the extruded plastic sheath 42 is continuously collapsed about the emerging chain 10 downstream of the extruder 20 with the assistance of atmospheric pressure. In the specific illustrated embodiment, the nose 26 of the guide die 28 is shown to project slightly beyond the tubing die 24 whereby the inside wall 48 of the sheath 42 is dimensionally controlled after leaving the tubing die 24.

By virtue of the above-described method, a tubular sheathed chain is ensured having an undulated outside surface conforming to the profile of the chain links. Moreover, the properties of the plastic sheath are enhanced to provide extended wear resistance under adverse environmental conditions by ensuring that the heated extruded sheath 42 emerges in a partially solidified state from the extruder 20 as seen in FIG. 2 whereby the sheath 42 is initially applied onto the chain 10 in a relaxed condition.

In addition to enhancing the wear-resistant properties of the sheath 42, the above-described method of collapsing a partially solidified sheath about a chain being fed at a speed greater than the extrusion rate of the plastic ensures a sheath exhibiting a residual longitudinal tension when completely solidified. The residual longitudinal tension set up within the sheath 42 is effective throughout the overall length of the chain links and is concentrated at the high points of the links at their maximum lateral dimension. The resulting sheath is thus provided with a longitudinal stress pattern, such as indicated by the broken lines 49, which generally connects the high points of the links, and a resulting hoop tension is effected with an intensity which varies from a minimum near the center of each link to a maximum at the high points adjacent the ends of the links.

Accordingly, the disclosed method provides a sheath 42 which resiliently biases the adjacent chain links away from one another to maintain the chain fully extended while at the same time ensuring continued flexibility of the chain by virtue of maintaining the voids within the links of the tubular sheathed chain. The resulting sheathed chain thus exhibits a resistance to compressional loading in addition to its above-mentioned advantages.

The chain 10 with its sheath 42 adhered thereon may then be drawn into a water bath 50 to be chilled by immersion in cold water contained in an elongated trough or series of troughs, if desired, before being fed through the capstan 22 and wound onto the tension-takeup reel 21.

While different extrudate compositions may be used to charge the extruder, nylons, vinyl polymers and similar commercial thermoplastics in a granular form have been used and have been found to provide suitable melt temperature and melt flow characteristics in addition to providing effective resistance to weather, abrasion and corrosion in a trough, rugged plastic sheath for a variety of commercial and industrial uses. Pigments, dyes, anticrack agents and other well-known modifiers of such thermoplastics may be added as desired without materially affecting the properties of the plastic sheath.

The above-described invention effects an economical method of manufacturing plastic sheathed chain in a continuous high-speed operation in addition to providing a significantly improved end product particularly suited for a wide variety of different applications having requirements for a relatively smooth surface while preserving the strength, durability and flexibility normally associated with conventional link chain.

As will be apparent to persons skilled in the art, different modifications, variations and adaptations of the foregoing specific disclosure can be made without departing from the underlying principles and teachings of this invention.

I claim:

1. A tubular sheathed chain comprising a link chain and a plastic sheath extruded thereabout and drawn down into intimate surface contact while in a partially solidified, relaxed state to provide an outer sheath of undulate conforming profile with voids internally of the sheathed chain, the sheath having a residual longitudinal tension throughout the chain links in a stress pattern which connects points on the links of maximum lateral dimension, the sheath resiliently biasing adjacent links away from one another for maintaining the sheathed chain in an extended condition while ensuring its flexibility by preserving voids within the links of the sheathed chain.

2. The tubular sheathed chain of claim 1 wherein the sheath intimately grips the chain with a residual hoop tension to resist longitudinal displacement therefrom, the hoop tension being of a maximum intensity adjacent the ends of the links at said points thereon of maximum lateral dimension.